P. H. F. KAUFMANN.
MICROMETER ADJUSTING MECHANISM FOR MICROSCOPES AND OTHER DEVICES.
APPLICATION FILED NOV. 19, 1908. RENEWED JAN. 2, 1914.
1,110,266.                                               Patented Sept. 8, 1914.
Fig. 1.
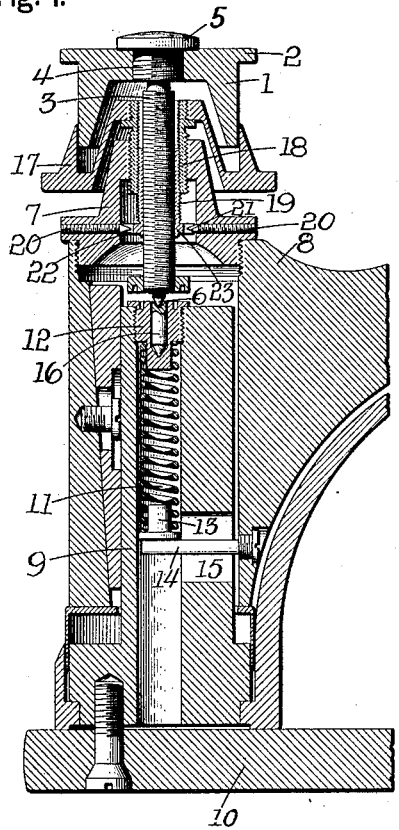
Fig. 2.
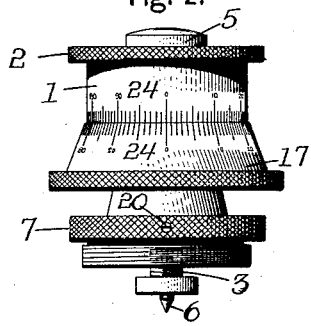
Fig. 3.
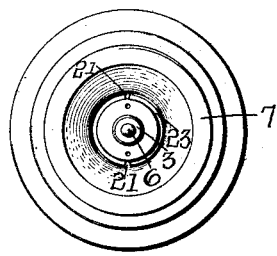
Fig. 4.
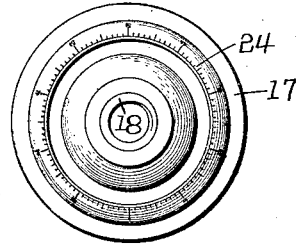
Fig. 6.
Fig. 7.
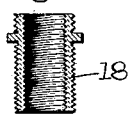
Fig. 9.
Fig. 5.
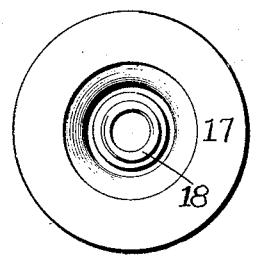
Fig. 8.
Fig. 10.
Witnesses.
L. M. Sangster.
George A. Neubauer.
Paul H. F. Kaufmann, Inventor.
By C. J. Sangster
                    Attorney.

UNITED STATES PATENT OFFICE.

PAUL H. F. KAUFMANN, OF NORTH TONAWANDA, NEW YORK.

MICROMETER ADJUSTING MECHANISM FOR MICROSCOPES AND OTHER DEVICES.

1,110,266. Specification of Letters Patent. Patented Sept. 8, 1914.

Application filed November 19, 1908, Serial No. 463,364. Renewed January 2, 1914. Serial No. 810,042.

*To all whom it may concern:*

Be it known that I, PAUL H. F. KAUFMANN, a citizen of the United States, residing at North Tonawanda, in the county of Niagara and State of New York, have invented a certain new and useful Improvement in Micrometer Adjusting Mechanism for Microscopes and other Devices, of which the following is a specification.

This invention relates to a micrometer adjusting mechanism for microscopes and other devices.

The object of the invention is to provide a plurality of adjustments of differing feed so that a very fine adjustment can be quickly and accurately obtained.

The invention also relates to certain details of the adjusting mechanism which will be hereinafter described reference being had to the accompanying drawings in which—

Figure 1 is a central vertical section through a portion of a microscope equipped with the improved micrometer adjustment. Fig. 2 is a side view of the improved micrometer adjustment detached from the microscope. Fig. 3 is a detached bottom view of the improved micrometer adjustment. Fig. 4 is a detached plan view of the speed reducing member of the micrometer adjustment. Fig. 5 is a detached bottom view of the same. Fig. 6 is a detached central section through the revoluble nut of the speed reducing member, the screw threaded sleeve carried thereby being shown in full. Fig. 7 is a detached central section through the screw threaded sleeve of the speed reducing member. Fig. 8 is a detached central section through the stationary member of the improved micrometer adjustment. Fig. 9 is a detached side elevation of the stationary sleeve. Fig. 10 is a detached plan view of the stationary sleeve.

In referring to the drawings for the details of construction like numerals designate like parts.

While the adjusting mechanism is shown in the accompanying drawings attached in a vertical position to a microscope it is equally adapted to be attached to the side or other suitable portion of a microscope or to be connected to other devices requiring a very fine accurate adjustment.

The adjusting mechanism consists of certain members or elements which are termed an adjusting member, a supporting or base member and a speed reducing member.

The adjusting member as constructed in the preferred adaptation illustrated comprises an upper or thumb nut 1, having a knurled flange 2 to afford a convenient turning grip for the fingers of the operator and a stem 3 which is screw threaded and has an enlarged head 4 which is screw threaded to screw into the thumb nut 1 and a top flange 5, which contacts with the upper surface of the thumb nut when the stem is in its centrally depending position with respect to the thumb nut. The lower end of the stem has a reduced cone point bearing 6 the purpose of which will be explained further on.

The form of supporting or base member shown in the drawings is a stationary nut 7 which is screwed firmly to the upper portion of a mounting 8, which carries the objective lens of the microscope. The mounting is adjustably supported on a pillar 9 which extends vertically upward from a microscope base 10.

The pillar 9 is hollow and a compression spring 11 is located therein with its upper terminal bearing against an end piece 12 closing the top mouth of the opening in the pillar and its lower terminal being fitted around a slide block 13 which is supported on a transverse pin 14 which is carried by the mounting and passes through a vertical slot 15 in the pillar. The end piece 12 has a top vertical socket in which a cone pointed pin 16 is located and said pin 16 has a conical depression in its upper end in which the cone end 6 of the stem 3 has bearing to center and support the stem.

The speed reducing member is preferably a revoluble nut 17, which is located between the thumb nut 1, and the stationary nut 7, and carries a sleeve 18, which is screw threaded both internally and externally. The internal and external screw threads on the sleeve 18 lead in the same direction but are of different pitch. The external thread which in the present form is the coarser pitch screws in the stationary nut 7 and the internal thread screws upon a separate stationary sleeve 19 which is likewise screw threaded both internally and externally and in turn screws upon the stem of the adjusting member. The purpose of the sleeve 19 is to prevent the revolving of either the adjusting member or the speed reducing member through the turning of the other member, as it constitutes an unrevoluble element which is directly interposed between the two members and intercepts and prevents the transmission of the turning movement from one member to the other. The sleeve 19 is preferably secured to the stationary nut against rotation by two oppositely disposed sets of screws 20 which have tapering points 21 that engage in recesses 22 in a bottom flange 23 on the sleeve.

A suitable scale 24 with division lines is marked on the thumb nut 1 and the speed reducing member so that the range of adjustment may be accurately determined. This scale takes the place of indicating pointers or hands which necessarily, from their position in proximity to the members, do interfere with the revolving of the members by preventing the grasping of their surface by the fingers of the operator at some point or points around their circumference or by striking against the fingers. With this mechanism both a comparatively coarse adjustment and also a very fine adjustment can be secured. The coarse adjustment is obtained by revolving the adjusting member, the degree of coarseness of adjustment being determined by the pitch of the thread on the stem of the adjusting member. The very fine adjustment is secured by turning the speed reducing member which rotates in the stationary member or nut and moves longitudinally in said member in one direction, and at the same time rotates on the stationary sleeve and bodily moves the stationary sleeve and the adjusting member in the same direction as the longitudinal movement of the speed reducing member in the stationary member, but to a less distance. It will thus be seen that the actual range of adjusting movement is the difference in length between the relatively opposite movements of the speed reducing member and the adjusting member so that an exceedingly fine adjustment is obtained. While the speed reducing member and the adjusting member move in opposite directions with respect to each other, the greater lead or movement of the speed reducing member actually carries the adjusting member with it, so that both members move oppositely with respect to each other and in the same direction with respect to the instrument to which they are attached.

While this adjusting mechanism is principally designed for securing fine focusing adjustment for microscopes, it is also adapted to instruments of precision or other devices requiring means to secure fine adjustments.

I claim—

1. In an adjustment device for microscopes and other instruments, an adjusting member, a base member, a speed reducing member intermediate the adjusting member and the base member and carrying a sleeve threaded both internally and externally and having threaded engagement with the base member and a separate revoluble sleeve between the adjusting member and the speed reducing member.

2. In an adjustment device for microscopes and other instruments, an adjusting member, a base member, a speed reducing member intermediate the adjusting member and the base member and a non-revoluble sleeve interposed between the adjusting member and the speed reducing member and threaded both internally and externally and having separate threaded engagement with the adjusting member and the speed reducing member.

3. In an adjustment device for microscopes and other instruments, a base member, a speed reducing member having threaded engagement with the base member, an adjusting member and a non-rotatable member interposed between and having threaded engagement with both the speed reducing member and the adjusting member.

4. In an adjustment mechanism for microscopes and other instruments, a revoluble adjusting member, a revoluble speed reducing member and a non-revoluble member interposed between the revoluble adjusting member and the revoluble speed reducing member.

5. In an adjustment device for microscopes and other instruments, a revoluble member having a stem, a base member, a speed reducing member intermediate the revoluble member and the base member and having threaded engagement with the base member, and a non-revoluble sleeve interposed between the revoluble member and the speed reducing member.

6. In an adjustment mechanism for microscopes or other instruments, the combination with a fixed element and a movable element, of variable adjusting mechanism for said movable element having a direct adjusting member and a differential adjusting member concentric with but entirely out of contact with said direct adjusting member, and means connecting said members for the transmission of longitudinal movement only.

7. In an adjustment mechanism for microscopes and other instruments, a revoluble adjusting member, a revoluble speed reducing member, a support for said members and means interposed between the members for preventing the transmission of rotation from one member to the other.

8. In an adjustment mechanism for microscopes and other instruments, a revoluble adjusting member, a revoluble speed reducing member, a support for said members and means interposed between the members and secured to the support for preventing the transmission of rotation from one member to the other.

9. In an adjustment mechanism for microscopes and other instruments, a revoluble adjusting member, a revoluble speed reducing member, a support for said members and an unrevoluble element interposed between the members for preventing the transmission of rotation from one member to the other.

10. In an adjustment mechanism for microscopes and other instruments, a revoluble adjusting member, a revoluble speed reducing member, a support for said members and an unrevoluble screw threaded sleeve interposed between the members.

11. In an adjustment mechanism for microscopes and other instruments, a revoluble adjusting member, a revoluble speed reducing member, a support for said members and an unrevoluble internally screw threaded sleeve interposed between the members.

12. The combination with an instrument such as a microscope having a fixed element and an adjustable element, of an adjusting member, a speed reducing member and a screw threaded sleeve fitted on the adjusting member and within the speed reducing member.

13. In an adjustment mechanism for microscopes or other instruments, the combination with a fixed element and a movable element, of variable adjusting mechanism for said movable element having a direct adjusting member and a differential adjusting member concentric with but entirely out of contact with said direct adjusting member, and non-rotatable means connecting said adjusting members for the transmission of longitudinal movement but not rotary movement from one of said adjusting members to the other adjusting member.

PAUL H. F. KAUFMANN.

Witnesses:
L. M. SANGSTER,
GEORGE A. NEUBAUER.

---

Copies of this patent may be obtained for five cents each, by addressing the "Commissioner of Patents, Washington, D. C."